Feb. 4, 1964  R. W. FRENCH  3,120,129
BALANCING EQUIPMENT
Original Filed March 23, 1959  8 Sheets-Sheet 4

INVENTOR
RICHARD W. FRENCH
ATTORNEYS

Feb. 4, 1964 R. W. FRENCH 3,120,129
BALANCING EQUIPMENT
Original Filed March 23, 1959 8 Sheets-Sheet 8

INVENTOR
RICHARD W. FRENCH
BY
Synnestvedt & Lechner
ATTORNEYS

United States Patent Office 3,120,129
Patented Feb. 4, 1964

3,120,129
BALANCING EQUIPMENT
Richard W. French, Johnsville, Pa., assignor to Tinius Olsen Testing Machine Company, Willow Grove, Pa., a corporation of Pennsylvania
Original application Mar. 23, 1959, Ser. No. 801,313, now Patent No. 3,101,620, dated Aug. 27, 1963. Divided and this application Nov. 25, 1960, Ser. No. 71,481
17 Claims. (Cl. 73—468)

This invention relates to equipment for determining static and/or dynamic unbalance in a workpiece.

This application is a division of my copending application Serial No. 801,313, filed March 23, 1959, now Patent No. 3,101,620.

In general the invention is concerned with balancing machines of the type having compensating weights on the machine cradle which are adjustable so as to provide a compensating moment equal and opposite to the unbalance moment of the workpiece, the angle and amount of the compensating force of the moment determining the place on the workpiece for unbalance correction.

In one aspect the invention contemplates improvements in such machines, particularly in the manner in which the compensating weights are adjusted to provide for necessary changes in angle and amount of the compensating force. In this regard the invention provides for a pair of rotatable compensating weights which are driven at the same speed as the workpiece but whose speed can be momentarily changed to position the weights so that their resultant force produces a moment which is equal and opposite to the unbalance moment. The speed may be changed so that in effect the weights, for changing the angle of the compensating force, move in the same direction and the same angular amount about their respective rotational axes and, for changing the amount of the resultant force, are movable in opposite directions the same angular amounts.

For driving and positioning the weights the invention contemplates synchro motor means to rotate the weights and synchro generator means to energize and drive the motors, the generator means being intercoupled with the motors by mechanical or electrical motion control means, the control means effecting the desired change in speed.

The invention is adaptable for use in a balancing machine wherein the workpiece is supported with its rotational axis extending either horizontally or vertically. In the latter regard the invention contemplates the workpiece to be supported in a cradle which is vertically suspended by a single, flexible strain rod which allows a maximum of cradle vibration with a minimum of restraint.

Certain of the features and advantages of the invention will be apparent from the following description taken in connection with the drawings wherein:

FIGURE 9 is an electrical wiring diagram showing the manner in which the synchro generators and synchro motors of FIGURE 5 are connected;

It is believed that the overall nature of the invention may be best understood if the manner in which the weights are manipulated to develop the required compensating force is first explained. This will be done in connection with FIGURE 12, parts $(a)-(f)$.

Figure 12:
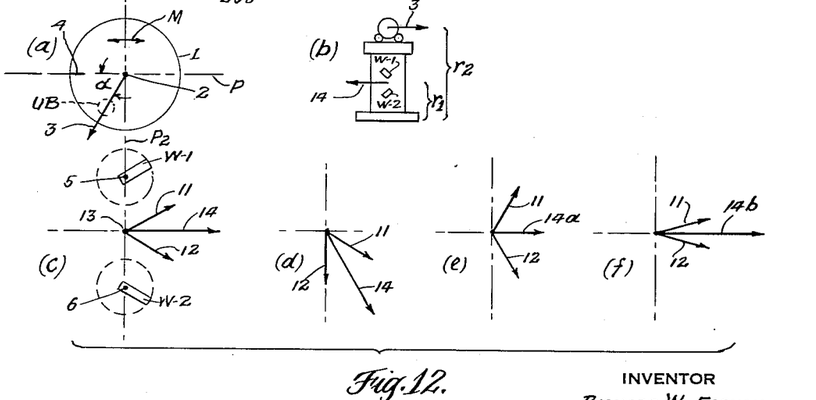
FIGURE 12 is a view illustrating the manner in which the weights of the invention are repositioned to change the angle and amount of the compensating force.

In part $(a)$ of FIGURE 12 the numeral 1 indicates a workpiece to be balanced, the workpiece being supported (on a cradle) to rotate about its axis 2. The unbalance in the workpiece may be assumed to be centered within the dotted lines UB. The mass UB lies within the so-called correction plane; i.e., the plane where unbalance compensation is to be effected. This unbalance is represented by the vector 3 which can be considered as rotating about the axis 2 in the correction plane. The workpiece and cradle are arranged so that the movement of the workpiece (and cradle) due to the unbalance force is confined to a horizontal vibration plane P (the plane P containing the axis of rotation 2). In other words, the workpiece vibrates back and forth in the plane P, the path of movement being shown by the arrows M. When any preselected point on the workpiece, say the point 4, is in the plane P the unbalance or vector 3 will be located from this plane by some angle $\alpha$. A pair of weights W-1 and W-2 are rotatably mounted on the cradle supporting the workpiece 1, the rotational axes 5 and 6 of the weights lying in a vertical plane P-2 containing the rotational axis 2. The weights are arranged so that their mass-centers rotate in the correction plane of the article. The weights are adapted to be rotated at the same speed as the workpiece 1. The force developed by the weight W-1 can be represented by a vector 11 and the force developed by the workpiece W-2 can be represented by a vector 12. Both of these vectors can be assumed to be rotated about a point 13 which lies in the plane P-2 and in the correction plane. The resultant force due to the weights W-1 and W-2 can be represented by a vector 14 which rotates about the point 13. Under static conditions the point 13 lies in the plane P-2 which is normal to the plane P and bisects the path of motion M developed by the workpiece when the same is rotating.

The resultant force or vector 14 of the weights also causes the workpiece to vibrate in the plane P. If the moment of the force or vector 14 is made equal and opposite to the amount of the force or vector 3, then the workpiece and cradle will stop vibrating. The moment of the vector 14 is made opposite to the moment of the vector 3 by adjusting the weights so that the force or vector appears in the horizontal plane at the same time as the vector 3 but spaced by 180°. Then the amount of the force or vector is adjusted so that the two moments are the same. The instantaneous condition of the foregoing is represented in part $(b)$ where the moment $F_{14} \times r_1$ is equal to the amount $F_3 \times r_2$.

For changing the angle of the vector 14 the invention contemplates that the weights W-1 and W-2 be moved in the same direction and in like amounts. In parts $(a)$ and $(c)$ of FIGURE 12 assume that the workpiece and weights occupy instantaneously the positions shown with the weights both at 60° to the plane P so that the vectors 3 and 14 are separated by 120°. If both weights W–1 and W–2 are moved (instantaneously) 60° clockwise, the vectors 11, 12 and 14 will assume the position shown in part (d). Thus, the instantaneous position of the vector 14 has been changed with respect to the vector 3, the two vectors being 60° apart. It will be apparent that by properly positioning the weights W–1 and W–2 the vector 14 can be opposing the vector 3. In the mechanism of the invention for positioning the weights their speeds are changed relative to the workpiece so that the angle change takes place in a part of or in several revolutions.

Where the amount of the vector 14 is to be changed the invention contemplates that the weights be moved in opposite directions but with like amounts. For example, if the weight W–1 is moved from its position of part (c) counter-clockwise 30° while the weight W–2 is moved clockwise 30°, the vectors 11, 12 and 14a will occupy the positions indicated in part (e). It will be observed that the vector 14a is smaller than the vector 14. On the other hand, if the weight W–1 is moved clockwise 15° and the weight W–2 is moved counter-clockwise 15° the vectors 11 and 12 will occupy the positions shown in part (f). The resultant vector 14b is longer than the vector 14.

Thus, it will be seen that by appropriately repositioning the weights the resultant vector can be made to assume the appropriate angle and amount.

While I have shown the weights as rotating in a vertical plane, it will be understood that the weights may rotate in a horizontal plane because the function of the weights is to develop a force and the same analysis as made above in connection with developing the appropriate moments applies to a horizontal disposition. Also, the workpiece may have its rotational axis vertical with the weights rotating in either a horizontal or vertical plane.

Rotation of the weights in a horizontal plane is preferred since the effect of gravity on the two weights is the same. With this arrangement it is preferred that the workpiece axis extend vertically which again eliminates any effect of gravity.

For ease of calibration it is preferred that the weights be identical in mass. Also, it is preferred that each weight be arranged so that its mass center rotates about a point which lies in the correction plane and in a plane containing the rotational axis of the workpiece. While compensation can be effected where the weights are not arranged in the preferred manner, for example, where the weights are in the correction plane but disposed on opposite sides of the axis plane, recalibration is necessary when the correction plane is changed. A change in correction plane may be required, for example, where a different type of workpiece is to be balanced.

Returning now to the detailed description, I have shown in FIGURES 1–4 a machine to which the invention is applicable, the machine suspending the workpiece with its axis extending vertically. The machine includes an upright frame F, having a base 20, a cabinet structure 21 on the base, a pair of upright columns 22 and 23 which are tied together at the top by a cross piece 24. A pair of struts 25 extend from the cross piece 24 to the base 20 and provide for stability of the columns. The frame F mounts the cradle C which comprises a pair of tubular members 30 and 31 connected at the top by cross piece 32 and connected at the bottom by the cross piece 33.

Also mounted on the tubes 30 and 31 is a cross piece 34, the ends of which are of split construction so that the piece may be adjusted up and down by loosening and tightening screws operated by the handles 35. The cross piece 34 carries a journal 36 which rotatably supports one end of a shaft 40 of a workpiece generally designated by WP. The lower cross piece 33 also carries a journal 41 which also rotatably supports the shaft 40.

The cradle is suspended by means of a single elongated strain rod 42 connected between the cross piece 24 of the frame and the cross piece 32 of the cradle. The construction is such that the axis of the strain rod is coplanar with the rotational axis of the workpiece.

This manner of suspending the cradle is an important feature of the invention because it allows the cradle to vibrate with a minimum of restraint.

The vibration of the cradle is confined substantially to a single vertical plane and this is accomplished by means explained following. Near the top, the column 22 carries a forwardly extending bracket 43 and the column 23 carries a forwardly extending bracket 44. On the forward ends of the brackets 43 and 44 are strain rods 45 and 46 which extend inwardly where they are attached to the cross piece 32 of the cradle. The columns 22 and 23 carry similar strain rods 50 and 51 which extend forwardly where they are connected with the cross piece 32.

On the lower part of the column 22 there is a forwardly extending bracket 52 and a similar bracket 53 on the column 23. The brackets 52 and 53 carry strain rods 54 and 55 which extend rearwardly where they are connected to the cross piece 33 of the cradle. The columns 22 and 23 carry similar strain rods 56 and 57, which extend forwardly where they are connected with the cross piece 33.

The strain rods mentioned above are all flexible and will bend when a force is applied radially. Bending due to axial forces is negligible. Therefore, when the unbalance of the workpiece causes the carriage to vibrate, this motion will be confined to a vertical plane which is parallel to the axis of the piece.

The compensating weights are mounted on the cradle in the manner described following. The cradle has a pair of generally U-shaped cross pieces 60 and 61, the ends of which are split so that the same can be moved up and down on the cradle by tightening and loosening screws controlled by the handles 62. The cross piece 60 extends rearwardly and at the center thereof mounts synchro motors 63 and 64, the rotors of which respectively carry weights 65 and 66. The cross piece 61 carries similar motors 70 and 71, the rotors of which mount the weights 72 and 73. The weights 65 and 66 are related to the correction plane CP–1 and to a plane P–1 (FIGURE 1) containing the rotational axis of the workpiece as explained above. The weights 72 and 73 are similarly arranged in the correction plane CP–2 and in the axis plane P–1.

Figure 1:
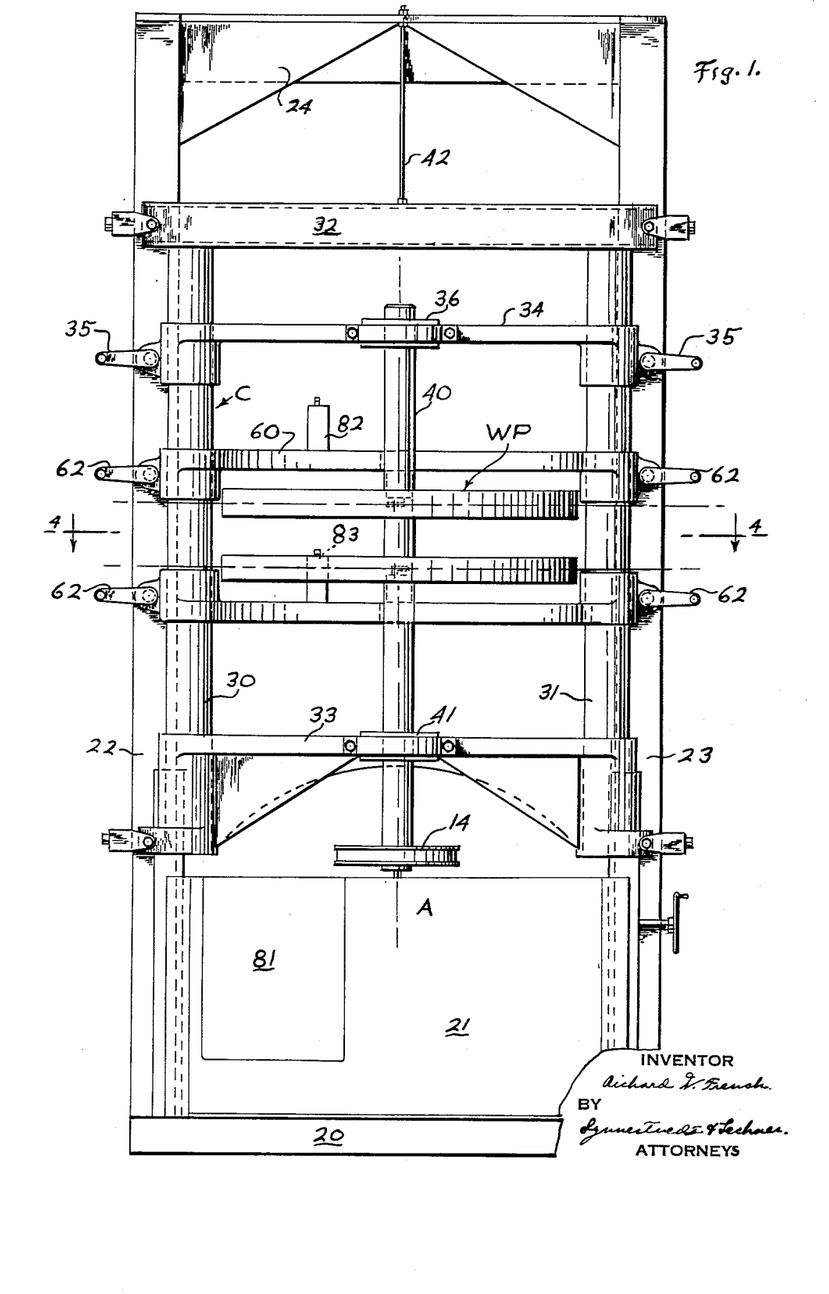
FIGURE 1 is a front elevational view of a balancing machine wherein the workpiece is suspended with its axis of rotation extending in a vertical direction.
Figure 2:
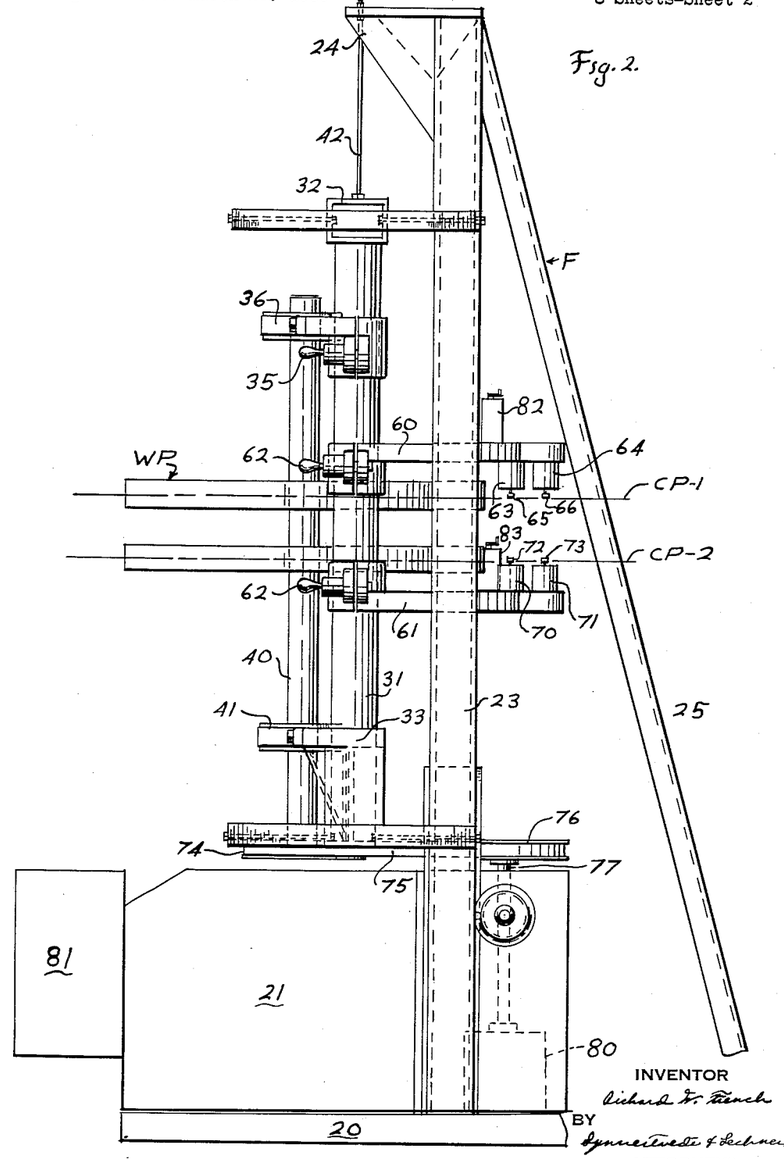
FIGURE 2 is an elevational view looking toward the left in FIGURE 1.
Figure 3:
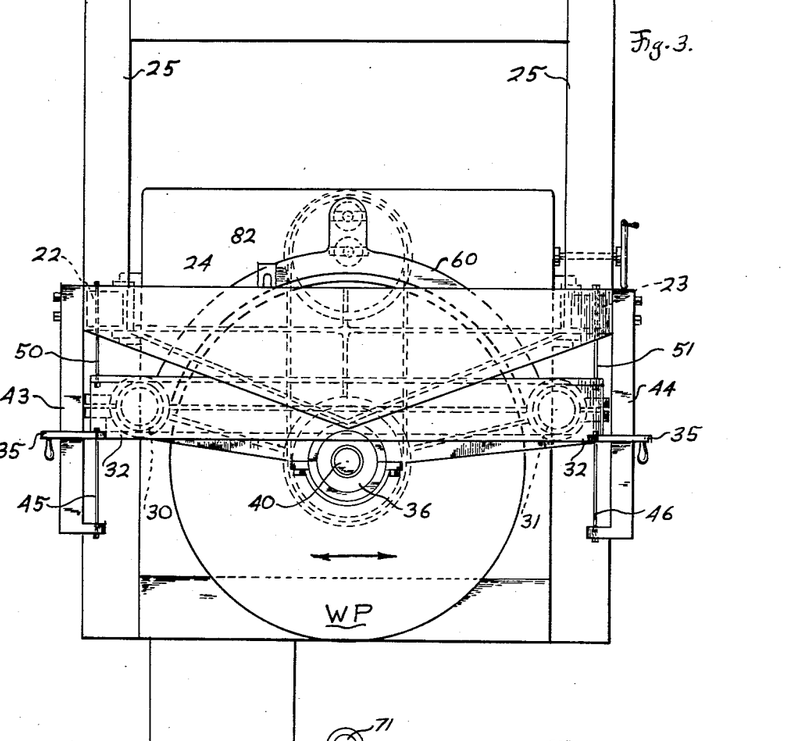
FIGURE 3 is a plan view of the machine of FIGURES 1 and 2.
Figure 4:
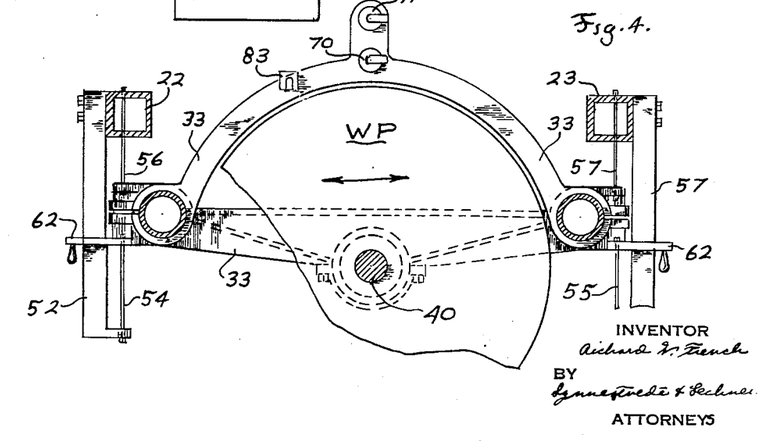
FIGURE 4 is a sectional view with certain parts omitted taken along the lines 4—4 of FIGURE 1.

The workpiece is adapted to be driven by a pulley 74 connected to its lower end, the pulley 74 being driven by a belt 75 on a pulley 76 connected to a shaft 77 coupled with a motor 80 by certain gearing not shown.

The cabinet 21 carries a housing 81 which is adapted to mount the synchro generators and associated mechanism for driving the synchro motors 63, 64, 70 and 71.

The cross pieces 60 and 61 mount the pick-ups 82 and 83. These pick-ups are preferably of the type shown in copending application of Sylvester Karpchuk, Serial No. 570,960, filed March 12, 1956, now Patent No. 2,946,218, assigned to the same assignee as this invention. The use of such pick-ups will be explained later.

Figures 5, 8:
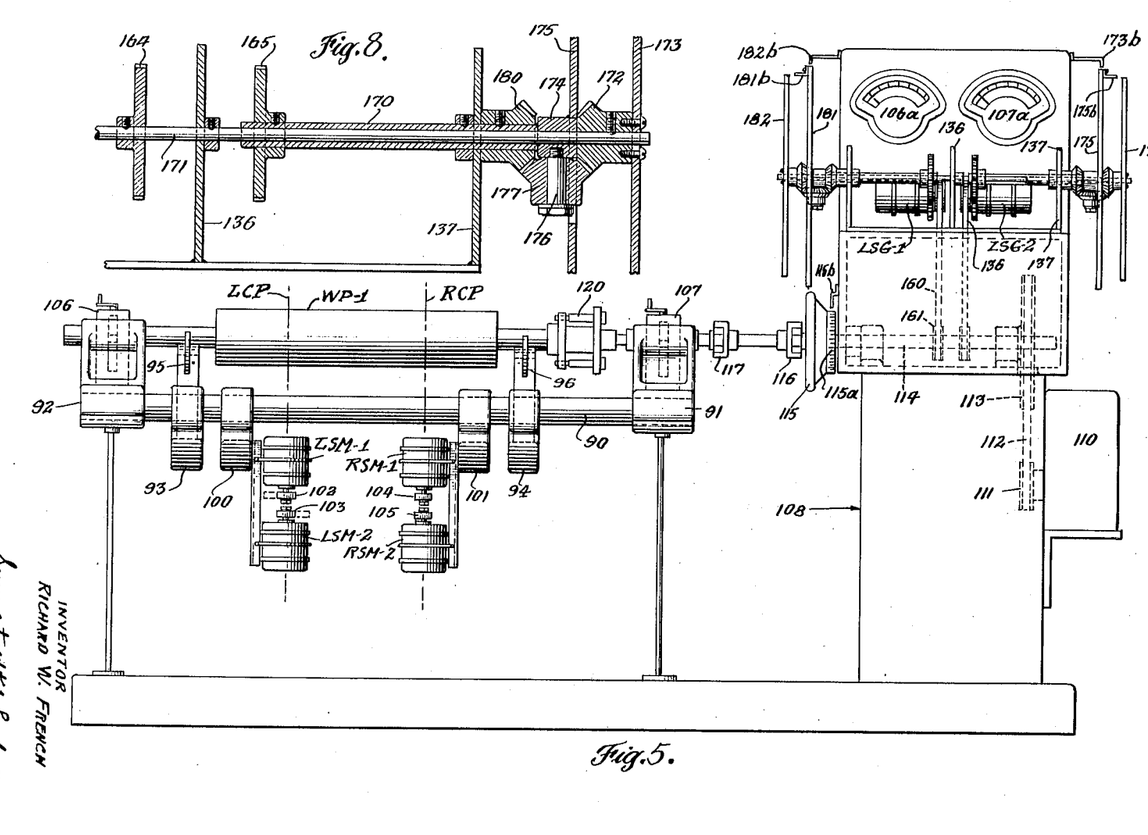
FIGURE 5 is an elevational view of a balancing machine wherein the workpiece is mounted with its axis extending generally horizontally and illustrating in part a typical arrangement of synchro generators and motors.
FIGURE 8 is a sectional elevational view taken along the lines 8—8 of FIGURE 7.

In FIGURE 5 I have shown a typical machine to which the invention is applicable, the machine supporting a workpiece with its rotational axis extending generally horizontally. The machine includes a generally rectangular-shaped cradle similar to the cradle described above and being constructed of a pair of spaced tubes, one of which is indicated at 90. The tubes are tied together by end pieces 91 and 92. The cross pieces 93 and 94 are adjustably mounted on the tubes and carry a pair of rollers 95 and a pair of rollers 96 for rotatably supporting the workpiece WP–1. The cross piece 100 on the tubes mounts a pair of synchro motors LSM–1 and LSM–2 which respectively carry the weights 102 and 103. The cross piece 101 carries the synchro motors RSM–1 and RSM–2, the rotors of which mount the weights 104 and 105. The weights 102 and 103 and the weights 104 and 105 are respectively related to the correction plane LCP and RCP and to a plane containing the rotational axis of the workpiece as explained above. It will be observed that the weights of FIGURES 1 and 5 are mounted to rotate in horizontal planes.

The cross pieces 91 and 92 mount the pick-ups 106 and 107 which are similar to the pick-ups 82 and 83 mentioned above.

On the right-hand side of FIGURE 5 a frame 108 carries a housing 110 which mounts a motor (not shown) driving a pulley 111 which drives a belt 112 connected to a pulley 113 on a drive shaft 114. The drive shaft 114 is interconnected to the workpiece via the hand wheel 115, universal joints 116, 117 and the couple 120.

The synchro motors LSM-1, LSM-2, RSM-1 and RSM-2 are driven by synchro generators as will be explained in connection with FIGURES 6 and 7.

Figure 6:
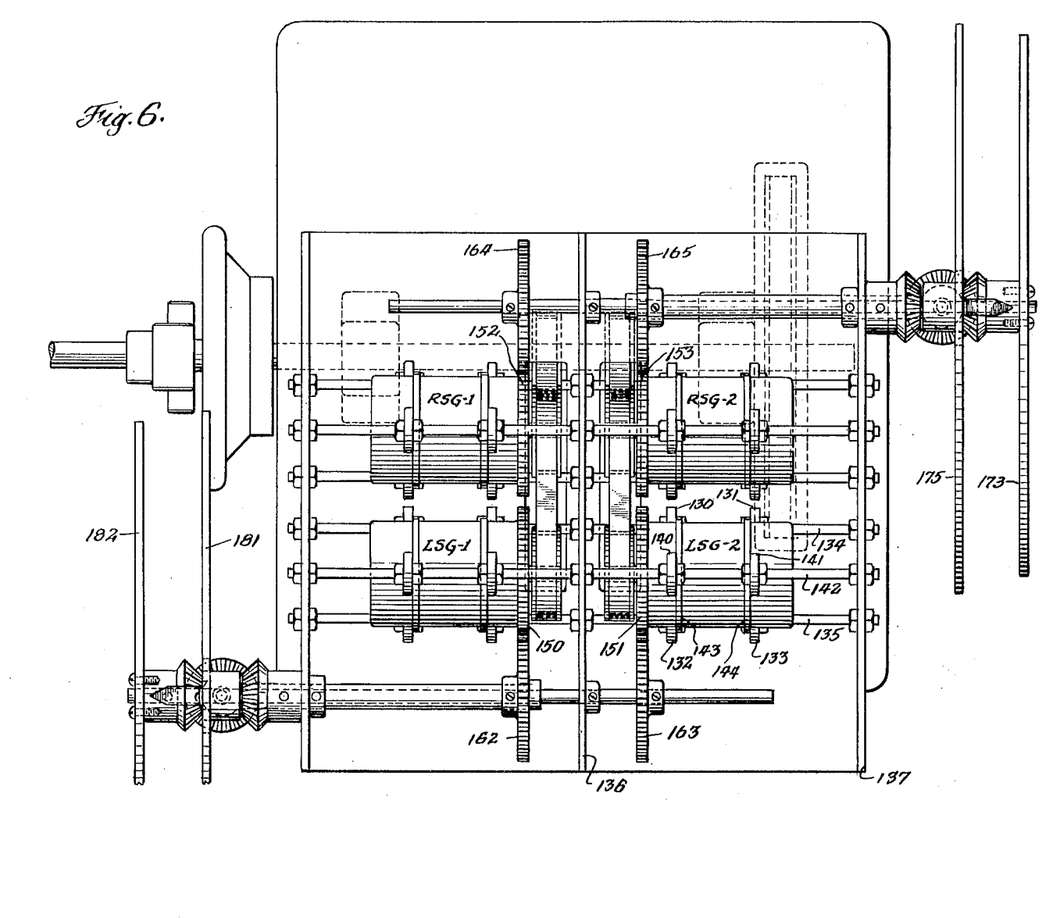
FIGURE 6 is an enlarged plan view of the synchro generators of FIGURE 5 with certain parts omitted.
Figure 7:
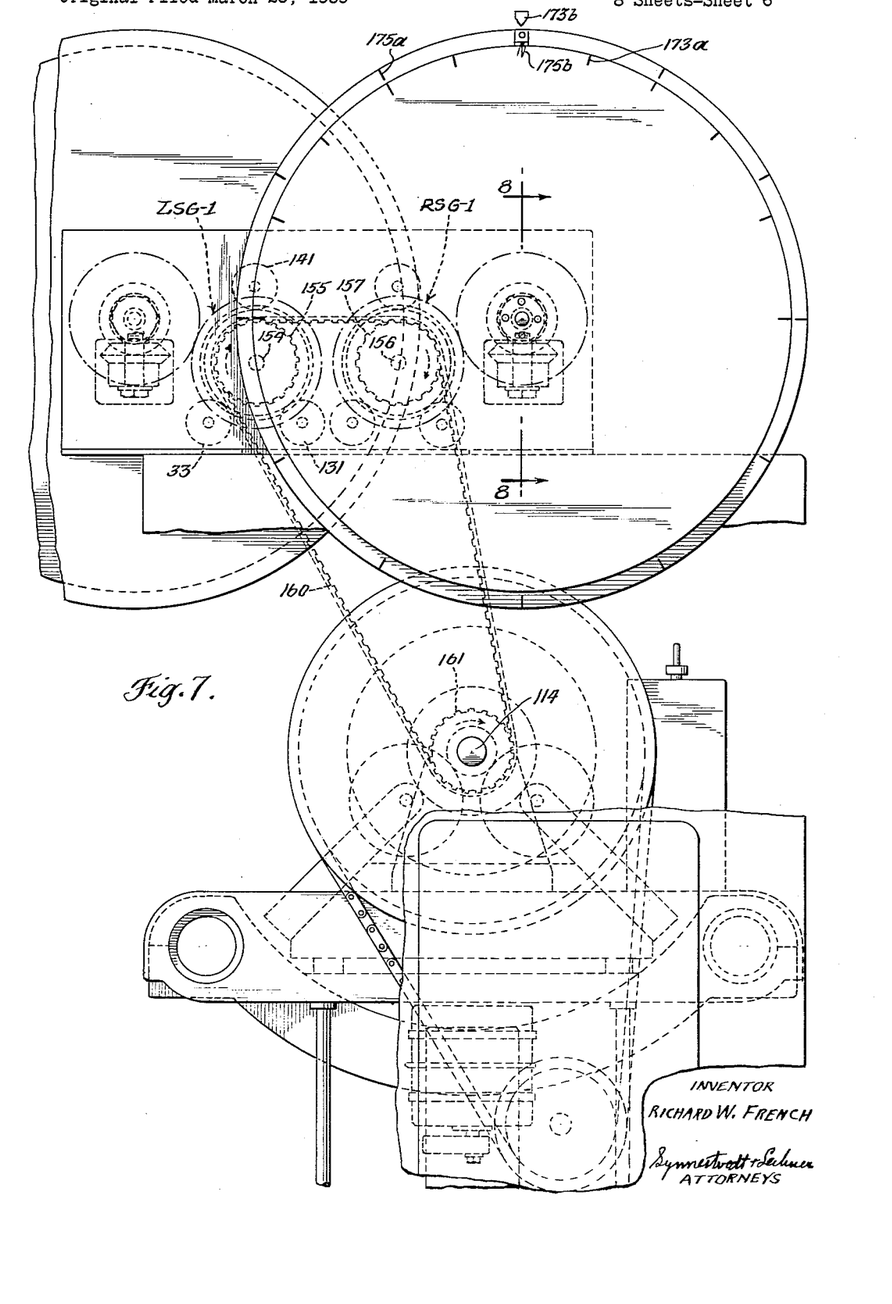
FIGURE 7 is an enlarged elevational view looking toward the left in FIGURE 6 illustrating the structure driving the rotors of the synchro generators at the same speed as the speed of the workpiece.

In FIGURE 6 I have shown a pair of synchro generators LSG-1 and LSG-2, the generator LSG-1 being for driving the motor LSM-1 and the generator LSG-2 for driving the motor LSM-2. These generators are also shown in FIGURE 5. I have also shown another pair of synchro generators RSG-1 and RSG-2. These respectively drive the motor RSM-1 and RSM-2.

All of these generators are mounted so that their respective housings are rotatable. Referring to generator LSG-2, its housing rests on two pairs of rollers, one pair being designated by 130 and 131 and the other pair by 132 and 133. The pair of rollers 130 and 131 are mounted on a rod 134 and the rollers 132 and 133 are mounted on a rod 135. Both of these rods are held fixed between the frame members 136 and 137. On the top, the housing of the generator LSG-2 is in engagement with the rollers 140 and 141 mounted on a rod 142 supported between the frame members 136 and 137. The generator is held against axial movement by the peripheral rings 143 and 144 which engage the various rollers as shown. The other generators LSG-1 and RSG-1 and RSG-2 are mounted in an identical manner.

Each generator housing carries a gear by means of which it is rotated. For example, the generator LSG-1 has a gear 150. The generator LSG-2 has a gear 151. The generator RSG-1 has a gear 152 and the generator RSG-2 has a gear 153.

The manner in which the housings are rotated will be explained shortly, but first it is desired to point out that each generator rotor is driven in synchronism with the workpiece. The manner of doing this will be clearly apparent from FIGURE 7 where it will be seen that the rotor shaft 154 of the synchro LSG-1 carries a pulley 155 and the rotor shaft 156 of the generator RSG-1 carries a pulley 157. Both of these pulleys are in engagement with a timing belt 160 which is coupled with a pulley 161 on the drive shaft 114. The ratio between the pulleys 161, 155 and 157 is 1:1 so that the generator rotors move at the same speed as the workpiece. The rotors of the generators LSG-2 and RSG-2 are similarly arranged to be driven at the same speed as the speed of the workpiece. Also, it will be observed that the direction of rotation of the workpiece and the rotors of the generators is the same.

The gears 150 and 151, 152 and 153 secured to the housings of the generators are respectively in mesh with gears 162, 163, 164 and 165. The gears 162 and 163 are driven by mechanism which is identical to the mechanism which drives the gears 164 and 165. Therefore, only the latter mechanism will be mentioned in detail. This mechanism is best shown in FIGURE 8 wherein it will be seen that the gear 165 is fixedly attached to a sleeve 170 extending through the frame member 137 and that the gear 164 is fixedly attached to a shaft 171 extending through the frame member 136 and rotatably mounted within the sleeve 170. On the extreme right end the shaft 171 carries a bevel gear 172 on which is mounted an amount disc 173. Mounted on the shaft 171 between the bevel gear 172 and the right-hand end of the sleeve 170 is a spacer 174 which carries an angle disc 175. The spacer and shaft are capable of relative rotation. The spacer also carries a stud 176 which rotatably supports a bevel gear 177 meshing with the gear 172. On the right-hand end of the sleeve 170 there is fixed a bevel gear 180 which is in mesh with the bevel gear 177.

From the above construction it will be apparent that if the angle disc 175 is rotated (by hand) this will cause rotation of the spacer 174 and stud 176 about the shaft 171. The stud will carry with it the gear 177 which, being in engagement with the gears 172 and 180, will cause rotation of the same. The rotation of the gear 172 causes rotation of the shaft 171 and rotation of the gear 180 causes rotation of the sleeve 170, the shaft and sleeve rotating in the same direction. Gears 164 and 165 will, therefore, rotate in the same direction. The rotation of the gears 164 and 165 will cause rotation of the gears 152, 153 which causes rotation of the housings (in the same direction) of the generators RSG-1 and RSG-2. This rotation of the housings of the generators RSG-1 and RSG-2 will cause the rotors of the motors RSM-1 and RSM-2 to change speed and position the weights 104 and 105 so that the angle of the resultant force or vector is changed. The manner in which the foregoing takes place will be explained more in detail later.

Also, it will be apparent from the above construction that if the angle disc 175 is held fixed and the amount disc 173 rotated, that the shaft 171 and sleeve 170 will rotate in opposite directions in the same amounts. This causes the gears 164 and 165 to rotate in opposite directions in the same amounts. The effect of this is to position the weights 104 and 105 for changing the amount of the resultant force.

The housings of the generators LSG-1 and LSG-2 are adapted to be moved by the angle disc 181 and amount disc 182 in a manner similar to that described above.

The gears 172, 177 and 180 in effect constitute a differential motion control device in that the gears 172 and 180 can be rotated in the same or in opposite directions in like amounts.

In FIGURE 9 I have shown the preferred manner of connecting the various generators and motors described above. It will be seen that the stator windings 183, 184, 185 and 186 of the generators are all energized by a pair of lines 190 and that the rotor windings 191, 192, 193 and 194 of the motors are energized by the same lines.

Also, it will be seen that the stator winding 200 of the generator LSG-1 is connected in parallel with the stator winding 201 of the motor LSM-1 by the lines 202. The stator winding 203 of the generator LSG-2 is connected in parallel with the stator winding 204 of the motor LSM-2 by the lines 205. The stator winding 206 of the generator RSG-1 is connected in parallel with the stator winding 207 of the motor RSM-1 by the lines 208. The stator winding 209 of the generator RSG-2 is connected in parallel with the stator winding 210 of the motor RSM-2 by the lines 211.

The synchro generators and motors per se are of standard construction. The manner in which such units operate is well known. For example, in the usual case if the rotor of the generator and motor units occupy identical positions with respect to their respective stators, then the voltages induced in the stators by transformer action will be identical and no circulating current will flow in the stator windings. However, if one rotor is displaced the induced voltages in the stator windings are no longer the same both in magnitude and in phase and a circulating current will be developed. This produces a torque in the undisplaced rotor and causes the same to rotate until the rotors occupy relatively identical positions with respect to their stators. In the present invention the synchro motors and generators are used in a manner which is different from the usual.

It will be recalled that all of the rotors of the generators are rotated in synchronism with the workpiece. Assuming, for example, that the stator of the generator LSG–1 and the stator of the motor LSM–1 each occupy the same relative positions in space, the rotor of the generator LSG–1 is being continuously displaced due to its rotation and this causes a torque in the motor LSM–1 to cause its rotor to assume a like displacement or rotate at the same speed. The instantaneous positions of the rotors with respect to their stators would be substantially the same. Since the rotor of the generator is being driven at the same speed as the workpiece, the rotor of the motor is operating at the same speed and hence the compensating weight 102 is rotating at the same speed as that of the workpiece. Now, assume that the stator of the generator is angularly displaced by some amount from its previous position. This will cause a voltage unbalance in the stator windings which causes circulating currents and the transformer action in the motor unit is such to produce a torque difference on the rotor and make the same change its speed or move relative to its stator until such time as the torque difference is zero or until the instantaneous positions of the rotor with respect to its stator is consistent (voltagewise) with the instantaneous positions of the generator rotor relative to its stator.

In view of the above, it will be seen then that by angularly rotating the stator of any of the generators the corresponding rotors of the driven motors can be made to assume different relative positions. This of course means that the weights attached to the rotors are made to assume different relative positions.

The manner in which the machine shown in FIGURE 5 operates will be described following. Assume that the workpiece is rotating and that unbalance exists in both the left correction plane LCP and the right correction plane RCP. Also assume that the unbalances in these planes are located at different angular positions such that the workpiece is dynamically unbalanced. This unbalance will then cause the cradle to vibrate back and forth and this motion will be sensed by the pick-ups 106 and 107. Since the vibration or displacement of the cradle is proportional to the amount of unbalance, the pick-ups will develop corresponding signals. The signal of pick-up 106 is amplified and then used to drive the meter 106a and the signal of pick-up 107 is amplified and used to drive the meter 107a. It is not necessary that the meters be calibrated in any particular way because the primary function of the pick-ups and meters is to indicate cradle vibration or that some unbalance exists.

Correction may be started in either correction plane and for explanation purposes I will start with the left correction plane. Assume that the weights are spaced by some angle other than 180° so that they produce a force. First, the angle disc 181 is rotated until the needle on the meter 106a reaches its lowest point. Then on the right side the angle disc 175 is rotated until the needle in the meter 107a reaches its lowest point on the scale.

The effect of turning the angle disc 181 is to cause the weights 102 and 103 to move in unison in the same direction so that the angle of the resultant force is changed. When this resultant force is 180° out of phase with the force of unbalance in the left correction plane, the needle on the meter 106a will be at its lowest point. The rotation of the angle disc 175 similarly effects the weights 104 and 105.

Then the angle disc 181 for the left correction plane is held fixed while the amount disc 182 is rotated until the needle of the meter 106a goes to a new low. Then the angle disc 175 for the right correction plane is held fixed while the amount disc 173 is rotated until the needle of the meter 107a finds a new low.

The new low positions of the needles of the meters 106a and 107a should now be zero. If the needles indicate an amount beyond zero, the angle and amount discs for each plane can be further manipulated as described above so that both meters indicate zero. This means that the cradle has stopped vibrating due to the fact that the compensating weights in each plane are producing a moment which cancels out the moment due to the unbalance forces.

The synchro generator units of FIGURE 6 are applied to the machine of FIGURE 1 for driving the motor units 63, 64, 70 and 71. The arrangement may be mounted in the housing 81 of FIGURE 1.

The amount discs and the angle discs may be calibrated so that when the same are in positions so that the cradle has stopped vibration the amount and angle of unbalance in each plane can be read directly. For example, the amount disc may have calibrations 173a (see FIGURE 7) and the angle discs have calibrations 175a. These calibrations respectively cooperate with pointers 173b and 175b mounted on the machine. The same type of an arrangement is used for the discs 182 and 181.

In place of the mechanical arrangement for appropriately rotating and positioning the weights as described above, differential synchros may be used. This is diagrammatically illustrated in FIGURE 10. The generator LSG for the left correction plane has its stator fixed, while its rotor is connected to be rotated in synchronism with the part to be balanced. The generator drives the motors LSM–a and LSM–b and these motors drive the weights 212 and 213. In lieu of shifting the stator of the generator LSG by mechanical means, the same effect may be obtained electrically by the differential synchros LSD–1 and LSD–2. As shown, the stators of the synchros are connected to gears 214 and 215 which mesh with each other and can be rotated in opposite directions by the rotation of a pinion 216 controlled by a knob 220. The rotors of the differential synchros are respectively connected to gears 221 and 222, which are in mesh with pinion 223. The gears may be rotated by a knob 224.

Figure 10:
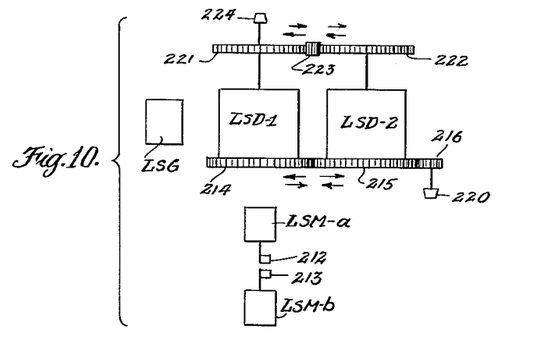
FIGURE 10 is a somewhat diagrammatic view of a synchro motor generator arrangement wherein differential synchros are used.

When the knob 220 is rotated, the stators are moved in opposite directions in the same amounts. The knob 220, therefore, is for changing amount. When the knob 224 is rotated, the rotors of the differential synchros rotate in the same direction in the same amount. The knob 224, therefore, is for changing angle.

An arrangement similar to that described above for the left correction plane is provided for the right correction plane.

Figure 11:
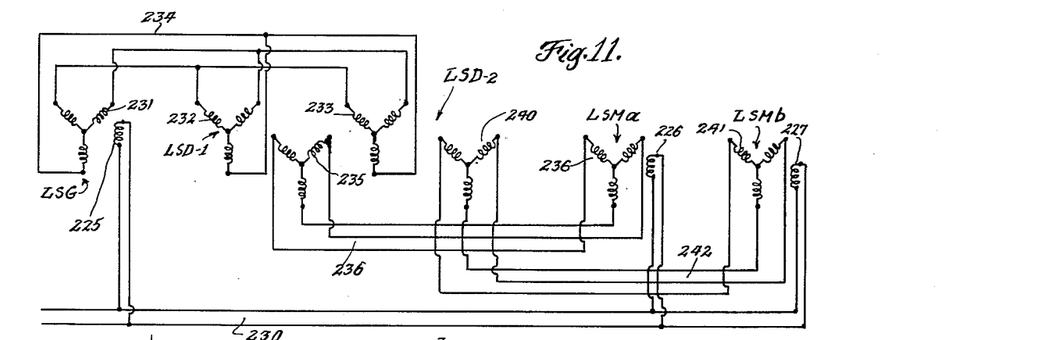
FIGURE 11 is a wiring diagram of the manner in which the synchros of FIGURE 10 are connected.

In FIGURE 11 I have shown the manner in which the synchros of FIGURE 10 are electrically connected. The rotor winding 225 of the generator LSG, the rotor winding 226 of the motor LSM–a and the rotor winding 227 of the motor LSM–b are all connected to the lines 230 so as to be energized from the same source. The stator winding 231 of the generator LSG is connected in parallel with the stator winding 232 of the differential synchro LSD–1 and also in parallel with the stator winding 233 of the synchro LSD–2 by the line 234. The rotor winding 235 of the differential synchro LSD–1 is connected in parallel with the stator winding 236 of the motor LSM–a. The rotor winding 240 of the synchro LSD–2 is connected in parallel with the stator winding 241 of the motor LSM–b by the lines 242.

The manner in which the above arrangement operates is as follows. For example, assume that the stator windings 231 and 232 occupy the same relative positions in space and also assume that the stator winding 232 and rotor winding 235 of the synchro LSD–1 are positioned so that there is no unbalanced voltage condition in the rotor winding 235. From an electrical standpoint, this is the same as if the stator winding 231 were directly connected to the stator winding 236 (like the arrangement of FIGURE 9). Thus, the rotor winding 226 will partake of the rotation of the rotor winding 225 and occupy an instantaneous position relative to its stator 236 which is the same as the instantaneous position of the rotor winding 225 with respect to its stator winding 231. If in the synchro LSD–1 either the stator winding 232 or the rotor winding 235 is changed in position (by rotating either knob 220 or 221) a voltage unbalance will exist in the windings 232, 235 and 236 and a torque will be exerted on the rotor winding 226 of the motor LSM-*a* so that the same changes its speed and seeks a position relative to the stator winding 236 to negate the unbalance condition. In other words, shifting the stator winding 232 or rotor winding 235 has the same effect as if the stator 231 of the generator LSG were shifted (as in the arrangement of FIGURE 9). From the foregoing then it will be apparent that by appropriately adjusting the stators and rotors of the differentials, the weights may be changed in position so that the resultant force produces a moment which is equal and opposite to that due to the unbalance in the part.

Before closing, it is desired to point out the manner in which the angle and amount discs shown in FIGURE 5 can be calibrated.

For this purpose a master workpiece having a known amount and angle of unbalance (in the right correction plane) is put into the cradle with the unbalance lying in, say, a horizontal plane. The weights 102 and 103 are removed. The master is then coupled to the drive system by manipulating the coupler 120. The hand wheel 115 is provided with a 360° scale 115*a* which may be shifted around the drive shaft 114. A pointer 115*b* is secured to the frame 107 and cooperates with the scale. The scale is shifted until the zero calibration coincides with the pointer 115*b*. Assuming that the weights 104 and 105 are displaced from one another at an angle other than 180° the workpiece is then rotated and the angle disc is manipulated in a manner described heretofore until the meter reads zero. Then the angle disc 175 is adjusted relative to the spacer 174 until the zero calibration coincides with the pointer 173*b*.

The angle disc is held fixed and the amount disc 173 manipulated until such time as the meter reads zero. Then a calibration is put on the amount disc which coincides with the pointer 175*b*. This calibration then represents the amount of calibration unbalance.

The above procedure establishes the angle calibration and several other masters having different weights may be inserted in the machine and the amount disc provided with further corresponding calibrations.

The discs 181 and 182 for the left correction plane are calibrated in a similar manner.

I claim:

1. In a balancing machine, mechanism for determining the amount and angle of unbalance in two correction planes of a workpiece to be balanced:

an elastically-supported cradle having means to rotatably mount a workpiece to be balanced, the unbalance of the workpiece producing forces for causing the cradle and workpiece to vibrate in said correction planes;

drive means to rotate the workpiece;

a first pair of weights disposed on the cradle with their mass centers lying in one of said correction planes and their axes of rotation under static conditions lying in a plane which is normal to and which bisects the path of motion of the workpiece in said one correction plane;

a first pair of synchro motors mounted on the cradle, the rotors of which are respectively connected to drive said weights;

a second pair of weights disposed on the cradle with their mass centers lying in the other correction plane and their axes of rotation under static conditions lying in a plane which is normal to and which bisects the path of motion of the workpiece in said other correction plane;

a second pair of synchro motors mounted on the cradle, the rotors of which are respectively connected to drive said second pair of weights;

a first pair of synchro generators, the rotors of which are connected to said drive means to be rotated at the same speed as the workpiece and the stators of which are rotatably mounted;

a first pair of discs;

interconnections between each disc and the stators of said first pair of synchro generators and mounting the discs to be manually rotated and providing for rotation of both stators in the same direction with rotation of both discs in the same direction and for rotation of both stators in opposite directions when one of the discs is rotated while the other is held non-rotatable;

a second pair of synchro generators, the rotors of which are connected to said drive means to be rotated at the same speed as the workpiece and the stators of which are rotatably mounted;

a second pair of discs;

interconnections between each last said discs and the stators of said second pair of synchro generators and mounting said second pair of discs to be manually rotated and providing for rotation of both stators in the same direction with rotation of both discs in the same direction and for rotation of both stators in opposite directions when one of the discs is rotated while the other is held non-rotatable;

electrical connections energizing the rotor windings of all of said synchros from a common source; and electrical connections connecting in parallel:

the stator windings of one of said first pair of motors and the stator windings of one of said first pair of generators;

the stator windings of the other of said first pair of motors and the stator windings of the other of said first pair of generators;

the stator windings of one of said second pair of motors and the stator windings of one of said second pair of generators;

the stator windings of the other of said second pair of motors and the stator windings of the other of said second pair of generators.

2. A construction in accordance with claim 1 wherein said weights are mounted to rotate in a horizontal plane.

3. A construction in accordance with claim 1 wherein said weights are mounted with their respective axes coaxial.

4. A construction in accordance with claim 1 wherein said cradle is supported so that the axis of rotation of the workpiece mounted thereon extends substantially horizontally.

5. A construction in accordance with claim 1 wherein said cradle is supported so that the axis of rotation of the workpiece mounted thereon extends substantially vertically.

6. In a balancing machine for determining the amount and angle of unbalance in two correction planes of a workpiece to be balanced:

an elastically-supported cradle having means to rotatably mount a workpiece to be balanced, the unbalance of the workpiece producing forces for causing the cradle and workpiece to vibrate in said correction planes;

drive means to rotate the workpiece;

a first pair of weights disposed on said cradle for use in determining unbalance in one of said correction planes;

a first pair of synchro motors mounted on said cradle, the rotors of which are respectively connected to drive said weights;

a second pair of weights disposed on said cradle for use in determining unbalance in the other of said correction planes;

a second pair of synchro motors mounted on said cradle, the rotors of which are respectively connected to drive said second pair of weights;

a first pair of synchro generators, the rotors of which are connected to said drive means to be rotated at the same speed as the workpiece and the stators of which are rotatably mounted;

a first pair of discs;

interconnections between each disc and the stators of said first pair of synchro generators and mounting the discs to be manually rotated and providing for rotation of both stators in the same direction with rotation of both discs in the same direction, and for rotation of both stators in opposite directions when one of the discs is rotated while the other is held non-rotatable.

a second pair of synchro generators, the rotors of which are connected to said drive means to be rotated at the same speed as the workpiece and the stators of which are rotatably mounted;

a second pair of discs;

interconnections between each last said discs and the stators of said second pair of synchro generators and mounting said second pair of discs to be manually rotated and providing for rotation of both stators in the same direction with rotation of both discs in the same direction and for rotation of both stators in opposite directions when one of the discs is rotated while the other is held non-rotatable;

electrical connections energizing the rotor windings of all of said synchros from a common source; and electrical connections connecting in parallel:

the stator windings of one of said first pair of motors and the stator windings of one of said first pair of generators;

the stator windings of the other of said first pair of motors and the stator windings of the other of said first pair of generators;

the stator windings of one of said second pair of motors and the stator windings of one of said second pair of generators;

the stator windings of the other of said second pair of motors and the stator windings of the other of said second pair of generators.

7. In a balancing machine for determining the amount and angle of unbalance in a correction plane of a workpiece:

an elastically-supported cradle having means to rotatably mount a workpiece to be balanced, the unbalance of the workpiece providing forces for causing the cradle and workpiece to vibrate in said correction plane;

drive means to rotate the workpiece;

a pair of weights disposed on said cradle for use in determining the unbalance in said correction plane;

a pair of synchro motors mounted on said cradle, the rotors of which are respectively connected to drive said weights;

a pair of synchro generators, the rotors of which are connected to said drive means to be rotated at the same speed as the workpiece and the stators of which are rotatably mounted;

a pair of discs;

interconnections between each disc and said stators and mounting the discs to be manually rotated and providing for rotation of both stators in the same direction with rotation of both discs in the same direction and for rotation of the stators in opposite directions when one of the discs is rotated while the other is held non-rotatable;

electrical connections energizing the rotor windings of all of said synchros from a common source; and electrical connections connecting in parallel:

the rotor windings of one of said motors with the rotor windings of one of said generators, and the rotor windings of the other of said motors with the rotor windings of the other of said generators.

8. In a balancing machine for determining the amount and angle of unbalance in a correction plane of a workpiece:

an elastically-supported cradle having means to rotatably mount a workpiece to be balanced, the unbalance of the workpiece providing forces for causing the cradle and workpiece to vibrate in said correction plane;

drive means to rotate the workpiece;

a pair of weights disposed on said cradle for use in determining unbalance in said correction plane;

a pair of synchro motors mounted on said cradle, the rotors of which are respectively connected to drive said weights;

a synchro generator, the rotor of which is connected to said drive means to be rotated at the same speed as the workpiece;

a pair of differential synchros, the stators and rotors of which are rotatably mounted;

interconnections between the rotors of said differential synchros providing for the rotors to be simultaneously rotated in the same direction;

interconnections between the stators of said differential synchros providing for the stators to be simultaneously rotated in opposite directions;

a pair of synchro motors mounted on said cradle and respectively connected to drive said weights;

electrical connections energizing the rotor windings of said generator and said motors from a common source; and electrical connections connecting in parallel:

the stator windings of said generator with the stator windings of said differential synchros;

the rotor windings of one of said differential synchros with the stator windings of one of said motors and the rotor windings of the other of said differential synchros with the stator windings of the other of said motors.

9. In a balancing machine for determining the amount and angle of unbalance in a correction plane of a workpiece:

an elastically-supported cradle having means to rotatably mount a workpiece to be balanced, the unbalance of the workpiece producing forces for causing the cradle and workpiece to vibrate in said correction plane;

drive means to rotate the workpiece;

a pair of weights disposed on said cradle with their mass centers lying in said correction plane and their axes of rotation under static conditions lying in a plane which is normal to and which bisects the path of motion of the workpiece in said correction plane;

a pair of synchro motors mounted on said cradle, the rotors of which are respectively connected to drive said weights;

a synchro generator, the rotor of which is connected to said drive means to be rotated at the same speed as the workpiece;

a pair of differential synchros, the stators and rotors of which are rotatably mounted;

interconnections between the rotors of said differential synchros providing for the rotors to be simultaneously rotated in the same direction;

interconnections between the stators of said differential synchros providing for the stators to simultaneously rotate in opposite directions;

a pair of synchro motors mounted on said cradle and respectively connected to drive said weights;

electrical connections energizing the rotor windings of said generator and said motors from a common source; and electrical connections connecting in parallel;

the stator windings of said generator with the stator windings of said differential synchros;

the rotor windings of one of said differential synchros with the stator windings of one of said motors and the rotor windings of the other of said differential synchros with the stator windings of the other of said motors.

10. In a balancing machine for determining the amount and angle of unbalance in a correction plane of a workpiece:
- an elastically-supported cradle having means to rotatably mount a workpiece to be balanced, the unbalance of the workpiece producing forces for causing the cradle and workpiece to vibrate in said correction plane;
- drive means to rotate the workpiece;
- a pair of weights disposed on said cradle with their axes of rotation under static conditions lying in a plane which is normal to and which bisects the path of motion of the workpiece in said correction plane;
- a pair of synchro motors mounted on said cradle, the rotors of which are respectively connected to drive said weights;
- a synchro generator, the rotor of which is connected to said drive means to be rotated at the same speed as the workpiece;
- a pair of differential synchros, the stators and rotors of which are rotatably mounted;
- interconnections between the rotors of said differential synchros providing for the rotors to be simultaneously rotated in the same direction;
- interconnections between the stators of said differential synchros providing for the stators to simultaneously rotate in opposite directions;
- a pair of synchro motors mounted on said cradle and respectively connected to drive said weights;
- electrical connections energizing the rotor windings of said generator and said motors from a common source; and
- electrical connections connecting in parallel:
- the stator windings of said generator with the stator windings of said differential synchros;
- the rotor windings of one of said differential synchros with the stator windings of one of said motors and the rotor windings of the other of said differential synchros with the stator windings of the other of said motors.

11. In a balancing machine for determining the amount and angle of unbalance in a correction plane of a workpiece:
- an elastically supported cradle having means to rotatably mount a workpiece to be balanced, the unbalance of the workpiece providing forces for causing the cradle and the workpiece to vibrate in said correction plane;
- drive means to rotate the workpiece;
- a pair of weights disposed on said cradle for use in determining the unbalance in said correction plane;
- a pair of synchro motors mounted on said cradle, the rotors of which are respectively connected to drive said weights;
- means to energize the rotor windings of each synchro motor with a signal having the same frequency as the rotational frequency of the workpiece;
- a pair of control windings respectively connected to the stator windings of said motors;
- means to energize each said control winding with a signal having the same frequency as the rotational frequency of the workpiece; and
- means for independently shifting the phase of each control winding signal with respect to the phase of the signal of said rotor windings.

12. Apparatus for compensating for unbalance in a rotating part comprising:
- support means rotatably supporting the part, the unbalance of the part developing forces causing the support means to vibrate;
- drive mechanism for rotating said part;
- a pair of weights disposed on said support means for developing forces to compensate at least in part for said first forces to effect stoppage of the vibration of said support means;
- a pair of synchro motors mounted on said support means, the rotors of which are respectively connected to drive said weights;
- means to energize the rotor windings of each said synchro motor with a signal having the same frequency as the rotational frequency of the part;
- a pair of control windings respectively connected to the stator windings of said motors; and
- means to energize each said control winding with a signal having the same frequency as the rotational frequency of the part and including mechanism for independently shifting the phase of each control winding signal with respect to the phase of the signal of said rotor windings.

13. Apparatus for compensating for unbalance in a rotating part comprising:
- support means rotatably supporting the part, the unbalance of the part developing forces causing the support means to vibrate;
- drive mechanism for rotating said part;
- a first pair of weights disposed on said support means for developing forces to compensate at least in part for first said forces to effect stoppage of the vibration of said support means;
- a second pair of weights disposed on said support means for developing forces to compensate at least in part for first said forces to effect stoppage of the vibration of said support means;
- a first pair of synchro motors mounted on said support means, the rotors of which are respectively connected to drive said first pair of weights;
- a second pair of synchro motors mounted on said support means, the rotors of which are respectively connected to drive said second pair of weights;
- means to energize the rotor winding of each of said synchro motors with a signal having the same frequency as the rotational frequency of the part;
- a first pair of control windings respectively connected to the stator winding of said first pair of motors;
- a second pair of control windings respectively connected to the stator winding of said second pair of motors;
- first means to energize each of said first control windings with a signal having the same frequency as the rotational frequency of the part and including mechanism for independently shifting the phase of the signal of each said first control winding with respect to the phase of the signal of said rotor windings; and
- second means to energize each of said second control windings with a signal having the same frequency as the rotational frequency of the part and including mechanism for independently shifting the phase of the signal of each said second control windings with respect to the phase of the signal of said rotor windings.

14. Apparatus for compensating for unbalance in a rotating part comprising:
- support means rotatably supporting the part, the unbalance of the part developing forces causing the support means to vibrate;
- drive mechanism for rotating said part;
- a pair of weights disposed on said support means to develop forces to compensate at least in part for first said forces to effect stoppage of the vibration of said support means;
- a pair of synchro motors mounted on said support means, the rotors of which are respectively connected to drive said weights;
- a synchro generator, the rotor of which is connected to said drive mechanism to be rotated at the same speed as said part;
- a pair of differential synchros, the stators and rotors of which are rotatably mounted;
- interconnections between the rotors of said differential synchros providing for rotors to be simultaneously rotated in the same direction;

interconnections between the stators of said differential synchros providing for the stators to be simultaneously rotated in opposite directions;
electrical connections energizing the rotor windings of said generator and said motors from a common source; and
electrical connections connecting in parallel:
the stator windings of said generator with the stator windings of said differential synchros, the rotor windings of one of said differential synchros with the stator windings of one of said motors and the rotor windings of the other of said differential synchros with the stator windings of the other of said motors.

15. Apparatus for compensating for unbalance in a rotating part comprising:
support means rotatably supporting the part, the unbalance of the part developing forces causing the support means to vibrate;
drive mechanism for rotating said part;
a first pair of weights disposed on said support means to develop forces to compensate at least in part for first said forces to effect stoppage of the vibration of said support means;
a second pair of weights disposed on said support means to develop forces to compensate at least in part for first said forces to effect stoppage of the vibration of said support means;
a first pair of synchro motors mounted on said support means, the rotors of which are respectively connected to drive said first pair of weights;
a second pair of synchro motors mounted on said support means, the rotors of which are respectively connected to drive said second pair of weights;
a first synchro generator, the rotor of which is connected to said drive mechanism to be rotated at the same speed as said part;
a second synchro generator, the rotor of which is connected to said drive mechanism to be rotated at the same speed as said part;
a first pair of differential synchros, the stators and rotors of which are rotatably mounted;
a second pair of differential synchros, the stators and rotors of which are rotatably mounted;
electrical connections energizing the rotor windings of said first generator and said first motors from a common source;
electrical connections energizing the rotor windings of said second generator and said second motors from a common source;
first electrical connections connecting in parallel:
the stator windings of said first generator with the stator windings of said first differential synchros, the rotor windings of one of said first differential synchros with the stator windings of one of said first motors and the rotor windings of the other of said first differential synchros with the stator windings of the other of said first motors; and
second electrical connections connecting in parallel:
the stator windings of said second generator with the stator windings of said second differential synchros, the rotor windings of one of said second differential synchros with the stator windings of one of said second motors and the rotor windings of the other of said second differential synchros with the stator windings of the other of said second motors.

16. Apparatus for compensating for the unbalance in a rotating part comprising:
support means rotatably supporting the part, the unbalance of the part developing forces causing the support means to vibrate;
drive mechanism for rotating said part;
a pair of weights disposed on said support means to develop forces to compensate at least in part for first said forces to effect stoppage of the vibration of said support means;
a pair of synchro motors mounted on said support means, the rotors of which are respectively connected to drive said weights;
a pair of synchro generators, the rotors of which are connected to said drive mechanism to be rotated at the same speed as said part and the stators of which are rotatably mounted;
a pair of discs;
interconnections between each said disc and said stators and mounting the discs to be manually rotatable and providing for rotation of both stators in the same direction with rotation of both discs in the same direction and for rotation of the stators in opposite directions when one of the discs is rotated while the other is held non-rotatable;
electrical connections for energizing the rotor windings of said motors and generators from a common source; and
electrical connections connecting in parallel:
the stator windings of one of said motors with the stator windings of one of said generators and the stator windings of the other of said motors with the stator windings of the other of said generators.

17. Apparatus for compensating for the unbalance in a rotating part comprising:
support means rotatably supporting the part, the unbalance of the part developing forces causing the support means to vibrate;
drive mechanism for rotating said part;
a first pair of weights disposed on said support means to develop forces to compensate at least in part for first said forces and effect stoppage of the vibration of said support means;
a second pair of weights disposed on said support means to develop forces to compensate at least in part for first said forces and effect stoppage of the vibration of said support means;
a first pair of synchro motors mounted on said support means, the rotors of which are respectively connected to drive said first pair of weights;
a second pair of synchro motors mounted on said support means, the rotors of which are respectively connected to drive said second pair of weights;
a first pair of synchro generators, the rotors of which are connected to said drive mechanism to be rotated at the same speed as said part and the stators of which are rotatably mounted;
a second pair of synchro generators, the rotors of which are connected to said drive mechanism to be rotated at the same speed as said part, and the stators of which are rotatably mounted;
a first pair of discs;
a second pair of discs;
interconnections between said first discs and the stators of said first synchro generators mounting the discs to be manually rotatable and providing for rotation of both stators in the same direction with rotation of both discs in the same direction, and for rotation of the stators in opposite directions when one of the discs is rotated while the other is held non-rotatable;
interconnections between each said second discs and the stators of said second synchro generators and mounting the discs to be manually rotatable and providing for rotation of both stators in the same direction with rotation of both discs in the same direction and for rotation of the stators in opposite directions when one of the discs is rotated while the other is held non-rotatable;
electrical connections energizing the rotor windings of all of said motors and generators from a common source;
first electrical connections connecting in parallel:

the stator windings of one of said first motors with the stator windings of one of said first generators, and the stator windings of the other of said first motors with the stator windings of the other of said first generators; and second electrical connections connecting in parallel:

the stator windings of one of said second motors with the stator windings of one of said second generators and the stator windings of the other of said second motors with the stator windings of the other of said second generators.

References Cited in the file of this patent

UNITED STATES PATENTS

| | | |
|---|---|---|
| 1,553,936 | Feeney | Sept. 15, 1925 |
| 2,608,856 | Van Degrift | Sept. 2, 1952 |
| 2,737,813 | Allen | Mar. 13, 1956 |
| 2,780,939 | Kellogg | Feb. 12, 1957 |
| 2,783,648 | Stovall et al. | Mar. 5, 1957 |
| 2,869,372 | Sihvonen | Jan. 20, 1959 |

FOREIGN PATENTS

| | | |
|---|---|---|
| 857,694 | Germany | Dec. 1, 1952 |